(12) United States Patent
Ochiai

(10) Patent No.: US 10,283,923 B2
(45) Date of Patent: May 7, 2019

(54) RESOLVER

(71) Applicant: MINEBEA CO., LTD., Kitasaku-gun, Nagano (JP)

(72) Inventor: Takaaki Ochiai, Yachimata (JP)

(73) Assignee: Minebea Co., Ltd., Nagano (JP)

( * ) Notice: Subject to any disclaimer, the term of this patent is extended or adjusted under 35 U.S.C. 154(b) by 210 days.

(21) Appl. No.: 15/188,417

(22) Filed: Jun. 21, 2016

(65) Prior Publication Data

US 2016/0377454 A1   Dec. 29, 2016

(30) Foreign Application Priority Data

Jun. 24, 2015   (JP) .................................. 2015-127094

(51) Int. Cl.
*H01R 39/32* (2006.01)
*G01D 5/20* (2006.01)
*H02K 5/22* (2006.01)

(52) U.S. Cl.
CPC .......... *H01R 39/32* (2013.01); *G01D 5/2046* (2013.01); *H02K 5/225* (2013.01)

(58) Field of Classification Search
CPC ........ H02K 24/00; H02K 3/522; H02K 5/225; G01D 5/2013; G01D 5/2046; H01R 39/32; G01R 33/02
See application file for complete search history.

(56) References Cited

U.S. PATENT DOCUMENTS

| 2012/0236479 A1* | 9/2012 | Tamai | B62D 5/0406 |
|---|---|---|---|
| | | | 361/679.01 |
| 2013/0049742 A1* | 2/2013 | Ochiai | H02K 24/00 |
| | | | 324/207.16 |
| 2015/0061652 A1 | 3/2015 | Otobe | |

FOREIGN PATENT DOCUMENTS

| JP | 2009-027841 | 2/2009 |
|---|---|---|
| JP | 2015-045510 A | 3/2015 |

OTHER PUBLICATIONS

Office Action dated Jun. 6, 2018 in the corresponding Chinese patent application No. 201610471328.0 with the English translation theref.

* cited by examiner

*Primary Examiner* — Alesa Allgood
*Assistant Examiner* — Brent J Andrews
(74) *Attorney, Agent, or Firm* — Carrier Blackman & Associates, P.C.; Joseph P. Carrier; Jeffrey T. Gedeon

(57) ABSTRACT

A resolver includes: a stator core; and an insulator that is mounted on the annular stator core, wherein a terminal pin base that extends outward in a radial direction is integrally formed in the insulator, wherein a plurality of terminal pins are disposed on the terminal pin base, wherein each of the terminal pins has a first connecting portion at one end and a second connecting portion at the other end, wherein first and second covers are provided on the terminal pin base at each sides in an axial direction, wherein the first connecting portion and the second connecting portion of the terminal pin are sealed in a filler which fills a first space and a second space, the first space being formed between the first cover and the terminal pin base, and the second space being formed between the second cover and the terminal pin base.

10 Claims, 5 Drawing Sheets

-- Related Art --

-- Related Art --

RESOLVER

BACKGROUND OF THE INVENTION

1. Field of the Invention

The present invention relates to a resolver, and in particular, relates to a resolver having a structure for protecting a terminal pin and a terminal.

2. Description of the Related Art

A resolver has been known as a device for detecting a rotation angle. The resolver is provided with a rotor that is fixed to a rotation shaft of a motor and rotates, and a stator that is fixed to a housing and the like and is disposed to face the rotor in a radial direction. An exciting winding and a detection winding are wound on the stator. The detection winding includes windings for outputting a sine signal and a cosine signal. When the rotor of the resolver is rotated by applying an exciting current to the exciting winding, the dimension of a clearance between the rotor and the stator changes, and the voltage corresponding to the change is induced to the detection winding. The voltage generated in the detection winding is a signal reflecting the angle of rotation of the rotor, and thus it is possible to detect the angle of the rotation shaft by using the signal.

The respective winding terminals of the exciting winding and the detection winding are connected to terminal pins that are disposed in a terminal pin base which is integrally formed with an insulator. There may be a problem that a portion in which the cooper wire of the winding terminal connected to the terminal pin is exposed is corroded in a usage environment of the resolver, which leads to poor conduction. Therefore, a resolver capable of preventing corrosion of the winding terminals of the resolver has been proposed (for example, see JP-A-2015-045510).

FIG. 8 is a plan view of a resolver 100 described in JP-A-2015-045510, and FIG. 9 is a perspective view of a stator portion thereof. The resolver 100 illustrated in FIG. 8 is provided with a wiring lead-out portion 111 in which a plurality of terminal pins are disposed, the terminal of a winding 114 is connected to each of the plurality of terminal pins, a terminal pin cover 115 that covers the plurality of terminal pins are mounted on the wiring lead-out portion 111, the terminal pin cover 115 is filled with a filler, and the terminal of the winding 114 connected to the terminal pin is sealed in the filler.

In the configuration disclosed in JP-A-2015-045510, terminals 113 integrally formed with terminal pins are disposed outward in radial direction the terminal pins, and a lead wire for connection with the outside is electrically connected to the terminals 113. In the configuration disclosed in JP-A-2015-045510, since the terminal of the winding 114 connected to the terminal pin is sealed in the filler that is filled in the terminal pin cover 115, it is possible to prevent the corrosion of the terminal of the winding. However, since the terminal 113 to which the lead wire for connection with the outside is electrically connected is exposed, there may be a problem that a portion of the lead wire connected to the terminal 113 is corroded and this leads to poor conduction.

SUMMARY OF THE INVENTION

One of objects of the present invention is to provide a resolver capable of preventing corrosion of a terminal of winding connected to a terminal pin, and a lead wire connected to the terminal, even when the resolver is used in an environment in which corrosive components exist.

According to an illustrative embodiment of the present invention, there is provided a resolver including: a stator core; a winding that is wound on the stator core; and an insulator that is mounted on the stator core, wherein a terminal pin base that extends outward in a radial direction is integrally formed in the insulator, wherein a plurality of terminal pins are disposed on the terminal pin base, wherein each of the terminal pins has a first connecting portion at one end and a second connecting portion at the other end, the first connecting portion being connected to a terminal of the winding, the second connecting portion being configured to be connected to an external lead wire, wherein a first cover is provided on the terminal pin base at one end side in an axial direction and a second cover is provided on the terminal pin base at the other end side in the axial direction, wherein a first space and a second space are filled with a filler, the first space being formed between the first cover and the terminal pin base, and the second space being formed between the second cover and the terminal pin base, and wherein the first connecting portion and the second connecting portion of the terminal pin are sealed in the filler.

DETAILED DESCRIPTION

Figure 1:
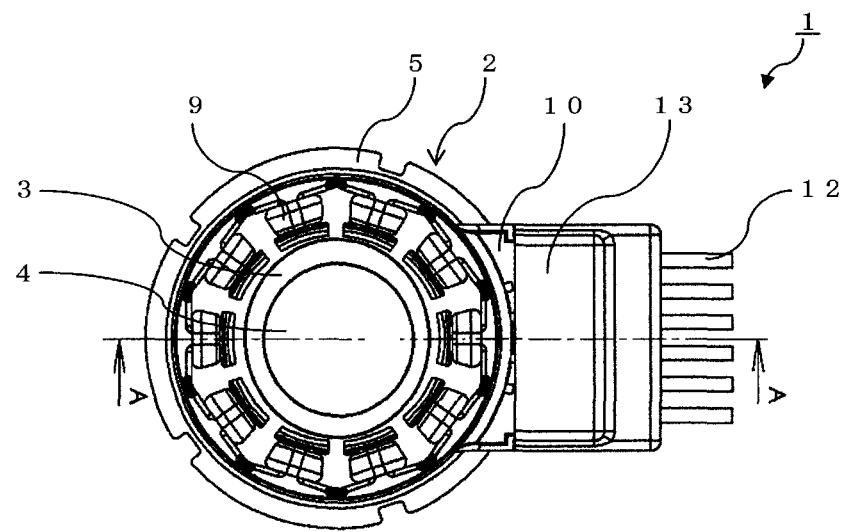
FIG. 1 is a plan view illustrating a resolver according to an embodiment.
Figure 2:
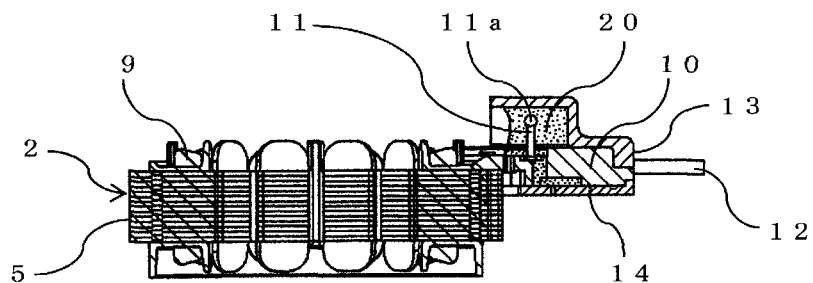
FIG. 2 is a cross-sectional view of the resolver taken along A-A line shown in FIG. 1.
Figure 3:
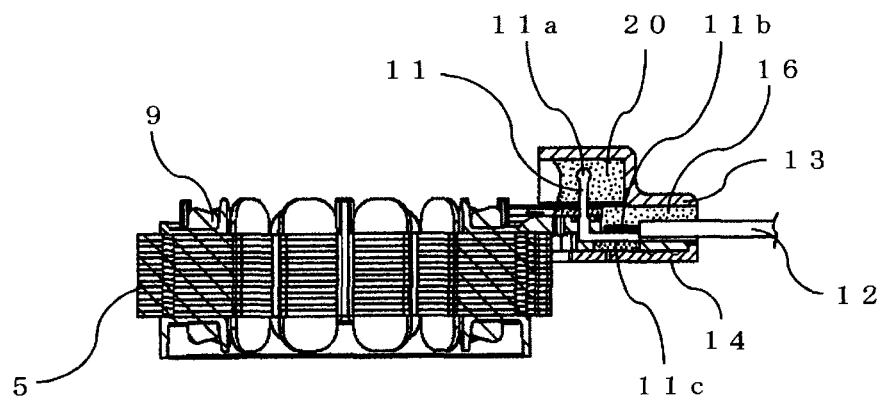
FIG. 3 is a cross-sectional view of the resolver shown in FIG. 1.
Figure 4:
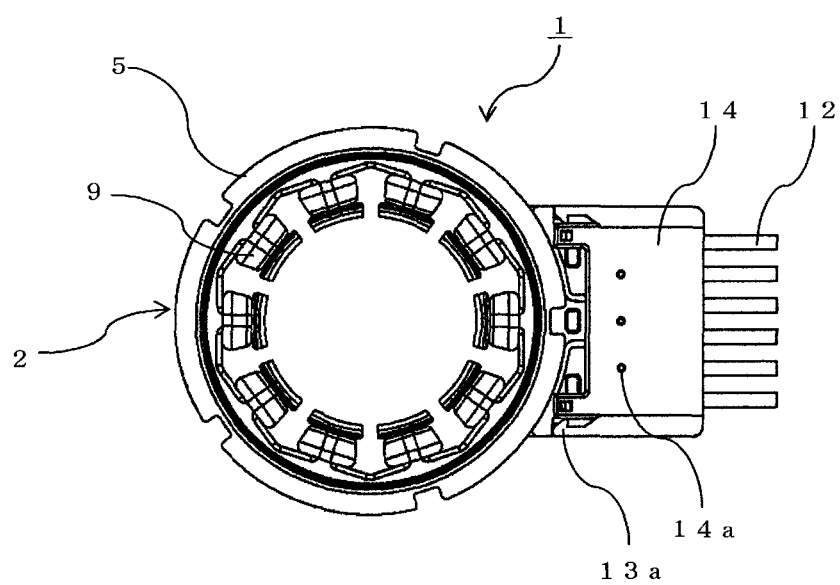
FIG. 4 is a bottom view of the resolver shown in FIG. 1.
Figure 5:
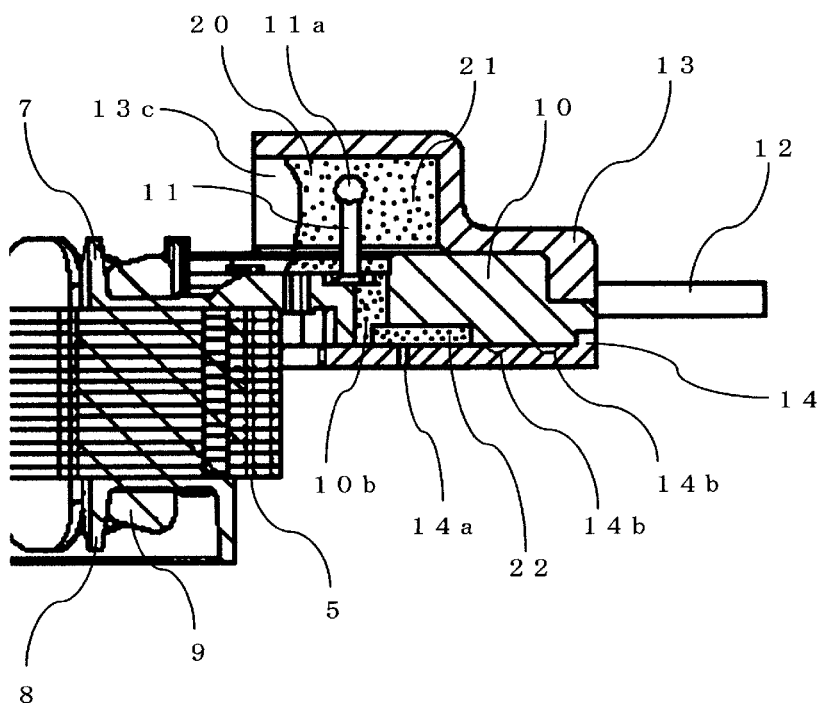
FIG. 5 is a cross-sectional view of the resolver shown in FIG. 1 illustrating a mounting state of a terminal pin cover and a slide cover.
Figure 5:
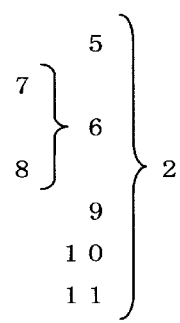
Figure 6:
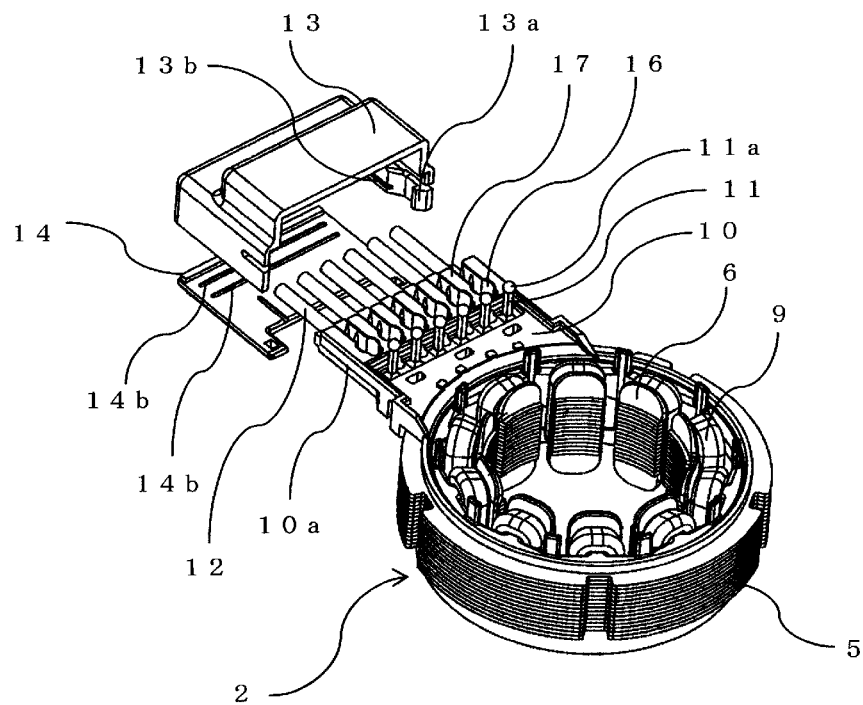
FIG. 6 is a perspective view of the resolver shown in FIG. 4 illustrating a state in which the slide cover is detached.

FIG. 1 illustrates a resolver 1 according to an embodiment of the present invention. The resolver 1 is a variable reluctance (VR) type resolver of an inner rotor type. The resolver 1 includes a stator 2, and a rotor 3 that is rotatable on the inner side of the stator 2. The rotor 3 has a structure of a shaft angle multiplier 2× including two convex portions which are formed on the outer peripheral surface. FIG. 2 is a cross-sectional view taken along an A-A line shown in FIG. 1. FIG. 3 is a cross-sectional view of FIG. 1. FIG. 4 is a bottom view of FIG. 1. FIG. 5 is a cross-sectional view illustrating a state in which a terminal pin cover and a slide cover are mounted on a stator in FIG. 1. FIG. 6 is a view illustrating a state in which the slide cover is detached in FIG. 4. For the sake of convenience, the rotor 3 is not illustrated in the drawings except in FIG. 1.

The rotor 3 is configured by stacking a plurality of sheets of thin plate-shape soft magnetic cores, and is fixed to the rotation shaft 4 of a motor (not illustrated). The stator 2 includes an annular stator core 5 that is formed by stacking a plurality number of sheets of thin plate-shape soft magnetic cores, a resin-made insulator 6 including a first insulator 7 and a second insulator 8 (see FIG. 5) which are respectively mounted on both ends in the axial direction of the stator core 5, and a winding 9 which is wound on the insulator 6 mounted on the stator core 5. The winding 9 includes the exciting winding and the detection windings of two phases of a sine phase and a cosine phase.

The thin plate-like soft magnetic core constituting the stator core 5 includes a plurality of teeth (pole teeth) (10 teeth in this embodiment) extending in the radial inwardly (the direction of the rotor 3) from an annular yoke portion. The stator core 5 is made by rotating and stacking (stacking while rotating) a plurality of sheets of cores and caulking them.

As illustrated in FIG. 5, the first insulator 7 is mounted on one end in the axial direction of the stator core 5, and the second insulator 8 is mounted on the other end in the axial direction of the stator core 5, and the exciting winding is wound on all teeth through the insulator 6, and the detection winding is wound on a predetermined teeth.

A terminal pin base 10 extending in the radial direction is integrally formed in the resin-made insulator 7 with integral molding. A plurality of (six in this example) terminal pins 11 are disposed in the terminal pin base 10. The terminal pin 11 is L-shaped, one end extends axially, and there is provided a winding tying portion 11a to which the terminal winding is tied. The other end of the terminal pin 11 extends outward in radial direction, and the distal end portion thereof is a terminal 11b which is connected to a lead wire 12 which is an external wiring.

As illustrated in FIG. 6, a terminal portion 17 is provided in the terminal pin base 10. Grooves 16, that accommodate the distal end (the distal end portion of which the peeled conductor part of the covering is exposed) of the lead wire 12, of the number corresponding to the number (six in this case) of the lead wires 12 are provided in the terminal portion 17. The terminal 11b of the terminal pin 11 described above is processed into a flat shape, and is located at the bottom portion of the groove 16 described above, and is exposed before it is filled with a varnish 20. As illustrated in FIG. 6, the distal end of the lead wire 12 is placed on the terminal 11b of the terminal pin 11 at the portion of the groove 16, and the lead wire 12 and the terminal pin 11 are brought into contact. As described below, when the terminal 11b of the terminal pin 11 and the lead wire 12 are fixed by welding, the electrode for welding is brought into contact with the rear surface 11c of the terminal. Therefore, in the stage to connect the lead wire 12 to the terminal 11b, the rear surface 11c of the terminal 11b is exposed.

The winding terminal of the exciting winding is tied to the winding tying portion 11a of the terminal pin 11 at each position to which the winding terminal of the detection winding corresponds and is electrically connected. Tungsten Inert Gas welding (TIG welding) is used as the method of connection, but the method is not limited thereto, and other methods such as soldering may be used insofar as electrical connection is made. In addition, the winding terminal is not illustrated in the drawings.

A terminal pin cover 13 (a first cover) covering the winding tying portion 11a and the terminal portion 17 is mounted on the side of the winding tying portion 11a of the terminal pin base 10. A slide cover 14 (a second cover) is mounted on the terminal pin base side on the opposite side of the winding tying portion 11a, and the rear surface 11c of the terminal 11b of the terminal pin 11 is covered with the slide cover 14.

A space 21 that is formed between the terminal pin cover 13 and the terminal pin base 10 is filled with the varnish 20 which is a filler (see FIG. 5). The varnish 20 filled in the space 21 also flows to a space 22 formed between the slide cover 14 and the terminal pin base 10 through a plurality of through-holes 10b which are formed in the terminal pin base 10, and fills the space 22. According to this structure, on the winding tying portion 11a side, a bonding portion of the terminal pin 11 and the winding 9 is sealed in the varnish 20 that fills the space 21. Then, on the opposite side of the winding tying portion 11a, the rear surface 11c of the terminal 11b of terminal pin 11 is sealed in the varnish 20.

Figure 7:
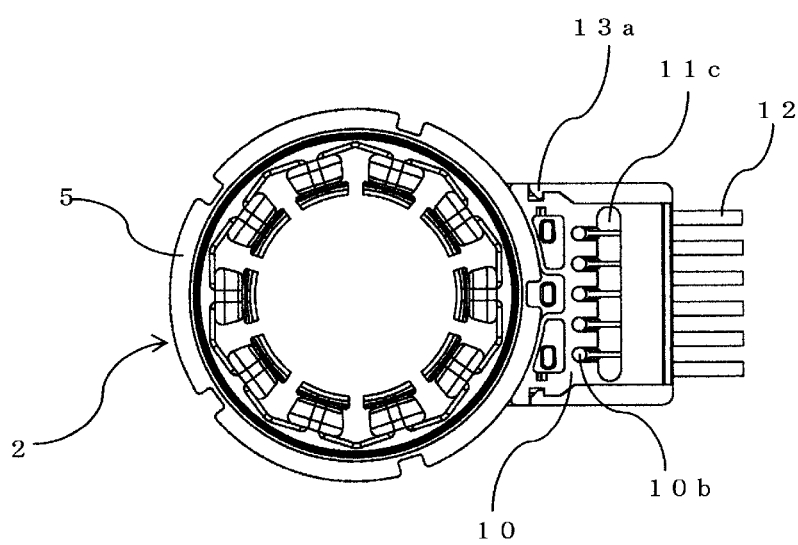
FIG. 7 is a top view of the resolver shown in FIG. 6 seen from the top.
Figure 8:
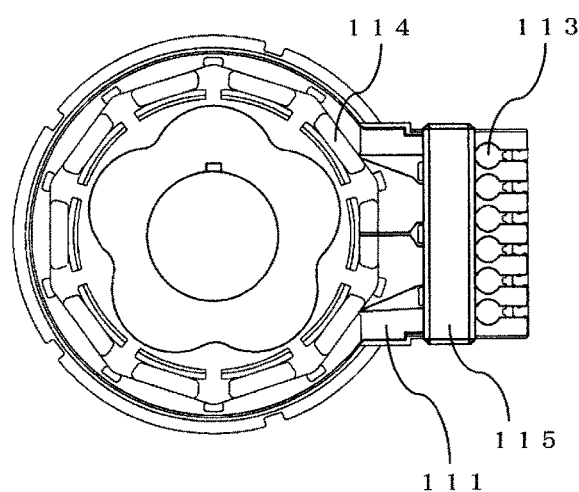
FIG. 8 is a plan view illustrating a resolver according to a related art.
Figure 9:
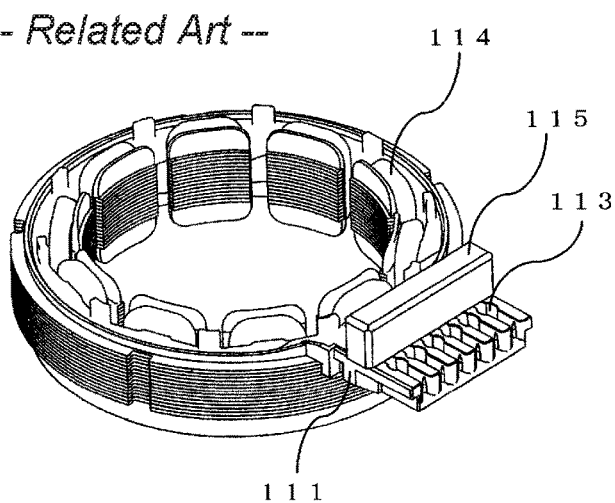
FIG. 9 is a perspective view of the resolver shown in FIG. 8.

In assembling the resolver 1, after connecting the winding terminal of the exciting winding and the winding terminal of the detection winding to the winding tying portion 11a of the terminal pin 11, in the interior of the groove 16 of the terminal portion 17, the lead wire 12 for connection with the outside is connected to the terminal 11b (the other end of the terminal pin 11) by resistance welding or the like. Since it is necessary to contact the electrodes for welding on the rear surface 11c of the terminal when performing the welding of the lead wire 12 to the terminal 11b, the rear surface 11c of the terminal as viewed from the perspective of FIG. 7 is exposed at this stage.

Next, the slide portion formed in the terminal pin cover 13 is engaged with the slide portion 10a (see FIG. 6) that is formed on the side surface of the terminal pin base 10 and caused to be slid. The terminal pin cover 13 is mounted on the terminal pin base 10 so as to cover the exposed portion of the terminal pin 11, by the engaging claw 13a formed in the distal end portion of the side surface of the terminal pin cover 13 engaging with the side surface of the terminal pin base 10.

Next, the slide cover 14 is mounted on the terminal pin cover 13 by fitting the slide cover 14 into the slide groove 13b formed in the inside of the terminal pin cover 13, and sliding the slide cover 14 from outward to inward direction in the radial outward direction. Since the slide cover 14 is mounted, the terminal pin cover 13 that covers the exposed portion and the winding tying portion 11a of the terminal pin 11 is mounted on the terminal pin base 10, and the slide cover 14 is mounted on the terminal pin base on the opposite side of the exposed portion of the terminal pin 11. Since the slide cover 14 is mounted, the rear surface 11c (see FIG. 7) of the terminal 11b is covered.

Next, the opening 13c of the terminal pin cover 13 is filled with the varnish 20, and the space 21 formed between the terminal pin cover 13 and the terminal pin base 10 is filled with the varnish 20. The varnish 20 filled in the space 21 also flows to the space 22 formed between the slide cover 14 and the terminal pin base 10 through a plurality of through-holes 10b which are formed in the terminal pin base 10, and fills the space 22. Since the space 21 is also connected to the groove 16 of the terminal portion 17, the varnish 20 also penetrates into the groove 16, and the groove 16 is filled with the varnish.

Through the above filling of the varnish 20, the bonding portion of the terminal pin 11 and the winding 9 and a fixed portion of the terminal pin 11 and the lead wire 12 are sealed in the varnish 20 on the side in which terminal pin 11 is exposed, and the rear surface 11c of the terminal 11b is sealed in the varnish 20 on the opposite side of the terminal pin 11.

Here, a plurality of through-holes 14a are formed in the slide cover 14 (In FIG. 4, three through-holes 14a are formed). The through-holes 14a are not illustrated in FIG. 6. With respect to the diameter of the through-hole 14a, a dimension is selected such that the varnish 20 filled in the space 22 does not flow out from the through-hole 14a to the outside. The through-hole 14a is used to check the filled state of the varnish 20 that is filled in the space 22 formed between the slide cover 14 and the terminal pin base 10. If the through-hole 14a is filled with the varnish 20, it is possible to determine that the space 22 is filled with the varnish 20. If the varnish 20 does not reach to fill the through-hole 14a, it is possible to determine that the varnish 20 is not sufficient to fill the space 22.

Grooves 14b are formed over the entire length in the width direction (the direction intersecting the radial direction) in the inside of the slide cover 14 (two grooves are formed in FIGS. 5 and 6). The inside of the slide cover 14 is in contact with the terminal pin base 10, except for portions forming the space 22 between the terminal pin base 10 and thereof. Therefore, the varnish 20 filled in the space 22 penetrates the contact surface of the slide cover 14 and the terminal pin base 10 by a capillary phenomenon. When this phenomenon becomes more significant, there is a possibility in which filling the varnish to the spaces 21 and 22 due to the outflow of the varnish may be insufficient. In the above structure, since the space is formed due to the groove 14b formed in the inside of the slide cover 14, the penetration of the varnish 20 entering to the abutting surface is stopped at the portion of the groove 14b due to the balance with the atmospheric pressure of this space. In other words, the groove 14b functions as a stopper for stopping the outflow of the varnish 20. The shape of the groove 14b is not limited to the illustrated shape, and other shapes are possible insofar as the groove 14b functions as a stopper for stopping the outflow of varnish.

As described above, in a resolver in which the fixed portion of the terminal pin 11 and the lead wire 12 is disposed on one end in the axis direction of the terminal pin base 10 and the rear surface 11c of the terminal 11b is disposed on the other end in the axis direction of the terminal pin base 10, the space 21 is formed between the terminal pin cover 13 and the terminal pin base 10, and the space 22 is formed between the slide cover 14 and the terminal pin base 10, and the spaces 21 and 22 are filled with the varnish 20, and thus the connecting portion of the terminal pin 11 and the lead wire 12, and the rear surface 11c of the terminal 11b are sealed in the varnish 20. According to this structure, since the space 21 faces the terminal portion 17 (see FIG. 5) and the groove 16, the varnish also flows into the groove 16 (a groove accommodating the distal end of the lead wire 12) of the terminal portion 17 from the space 21, and the groove 16 is also penetrated by and filled with the varnish. Therefore, the fixed portion of the terminal 11b which is the other end of the terminal pin 11 and the lead wire 12 is also sealed by the varnish 20. According to the this structure, it is possible to prevent the corrosion of the terminal of the winding 9 connected to the terminal pin 11, and the lead wire 12 connected to the terminal 11b which is the other end portion of the terminal pin 11, even if the resolver 1 is used in an environment in which corrosive components are present.

In the above described structure, the fixed portion of the terminal pin 11 and the lead wire 12 and the rear surface 11c of the terminal 11b are sealed in the varnish 20 that is filled in the space 21 formed between the terminal pin cover 13 and the terminal pin base 10 and the space 22 formed between the slide cover 14 and the terminal pin base 10. Therefore, it is possible to prevent the occurrence of rust due to moisture and corrosion caused by sulfur components contained in oil or the like in the terminal pin and the terminal, in particular, even if the resolver 1 is used in the environment in which corrosive components exist, the environment in which, for example, moisture or sulfur components contained in oil or the like exist.

Since the winding tying portion 11a of the terminal pin 11 and the groove 16 of the terminal portion 17 are covered with the terminal pin cover 13, the sealing due to the varnish described above is performed reliably. In the above example, since the terminal 11b (the other end of the terminal pin 11) and lead wire 12 are connected by electric welding such as resistance welding, and are need to be in contact with the electrodes for welding at this time, the rear surface 11c of the terminal 11b needs to be exposed. If this part remains by being exposed, the corrosion progresses from the rear surface 11c of the terminal 11b, and there is a possibility that conduction failure occurs. However, in the above example, since the space 22 is filled with the varnish, and the rear surface 11c of the terminal 11b that was exposed at the time of welding is sealed with the varnish, the corrosion from the rear surface 11c of the terminal 11b is prevented.

Further, since the connecting portion of the terminal pin 11 and the lead wire 12 and the rear surface 11c of the terminal 11b are sealed in the varnish 20 even in an environment where the resolver 1 is directly in contact with water, it is possible to prevent the occurrence of short between terminals.

Insofar as a protective structure is capable of achieving similar functions to the above-described structure, the embodiment of the present invention is not limited to the example described above. In addition, a configuration is possible in which the connecting portion of the lead wire 12 is not disposed on the terminal pin side but rather on the opposite side and the rear surface 11c of the terminal 11b is disposed on the terminal pin 11 side. The varnish is preferred as the filler, but insofar as the same function as the varnish are provided, other resin-based filler, for example, a filler such as a silicone resin and an acrylic resin may be used.

Although the filler filled in the first space 21 and the filler filled in the second space 22 are in communication with the through-hole 10b, a configuration may be used in which each space is filled with a filler without using the through-hole 10b.

Although the slide cover 14 is formed in a separate body from the terminal pin cover 13, the slide cover 14 may of course be a configuration of being integrally formed with the terminal pin cover 13.

In the embodiment of the present invention, the slide cover 14 is configured to be mounted by being fitted into the slide groove 13b formed on the inside of the terminal pin cover 13, and being slid from outward to inward direction in the radial direction, however, the slide cover 14 may be replaced with other type of cover that is mounted by means other than sliding.

Although resistance welding is used as the bonding means between the terminal 11b and the lead wire 12, insofar as they can be electrically connected, other bonding means can be used.

As described above, the resolver of the present invention is suitable when the resolver is used in the environment in which corrosive components are present, for example, moisture or sulfur components contained in oil or the like are present, however, the resolver may be used in an environment without such corrosive components.

According to the present invention, there is provided a resolver capable of preventing the corrosion of the terminal of the winding connected to the terminal pin, and the lead wire connected to the terminal, even if the resolver is used in an environment in which corrosive components exist.

What is claimed is:

1. A resolver comprising:
   a stator core;
   an insulator that is mounted on the stator core;
   a winding that is wound on the insulator mounted on the stator core;
   a terminal pin base that extends outward in a radial direction and is integrally formed in the insulator, the terminal pin base including:
   a plurality of grooves provided on the terminal pin base, each of the plurality of grooves receiving one of a plurality of external lead wires,
   a plurality of terminal pins that are disposed on the terminal pin base,
   each of the terminal pins having a first connecting portion at one end and a second connecting portion at the other end;
   a first cover that is provided on the terminal pin base at one end side in an axial direction; and
   a second cover that is provided on the terminal pin base at the other end in the axial direction,
   wherein the first connecting portion of each terminal pin is connected to the winding, and the second connecting portion of each terminal pin is configured to be connected to one of the external lead wires,
   wherein a first space is formed between the first cover and the terminal pin base and the first connecting portion is disposed in the first space,
   wherein a second space is formed between the second cover and the terminal pin base,
   wherein the second connecting portion of each terminal pin is disposed inside a respective groove of the plurality of grooves and is exposed to the second space,
   wherein the first space, the second space and the plurality of grooves are filled with a filler, and
   wherein the first connecting portion and the second connecting portion of each terminal pin are sealed in the filler.

2. The resolver according to claim 1,
   wherein the second cover is engaged with the first cover.

3. The resolver according to claim 1,
   wherein the filler filled in the first space and the filler filled in the second space are in communication through a through-hole.

4. The resolver according to claim 1,
   wherein the first cover is provided with an engaging claw which engages with a side surface of the terminal pin base.

5. The resolver according to claim 1,
   wherein the first cover covers the plurality of grooves.

6. The resolver according to claim 1,
   wherein a plurality of through-holes are formed in the second cover.

7. The resolver according to claim 1,
   wherein the second connecting portion of each terminal pin is located at a bottom portion of the respective groove of the plurality of grooves.

8. The resolver according to claim 1,
   wherein the first space and the plurality of grooves are communicated with each other.

9. The resolver according to claim 1,
   wherein a recess extending in a direction intersecting the radial direction is formed inside the second cover at a position outward in the radial direction from the second space.

10. The resolver according to claim 9,
    wherein the recess is formed on a surface of the second cover abutting on the terminal pin base.

* * * * *